Oct. 16, 1956 J. M. EARLY 2,767,358

SEMICONDUCTOR SIGNAL TRANSLATING DEVICES

Filed Dec. 16, 1952

INVENTOR
J. M. EARLY
BY [signature]
ATTORNEY 2,767,358

SEMICONDUCTOR SIGNAL TRANSLATING DEVICES

James M. Early, Morristown, N. J., assignor to Bell Telephone Laboratories, Incorporated, New York, N. Y., a corporation of New York Application December 16, 1952, Serial No. 326,312

5 Claims. (Cl. 317—239)

Figure 1:
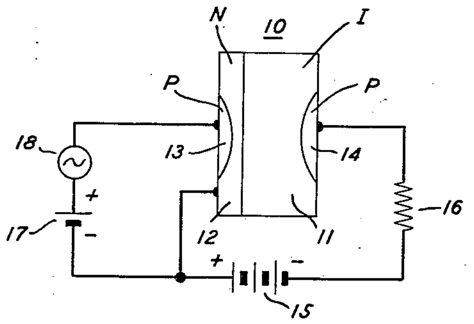

This invention relates to semiconductor signal translating devices of the type now known as transistors and more particularly to junction transistors.

Junction transistors, such as illustrated in Patent 2,569,347, granted September 25, 1951, to W. Shockley, comprise, in general, a body of semiconductive material, such as germanium or silicon, having therein a zone of one conductivity type between and defining junctions with a pair of zones of the opposite conductivity type. Individual substantially ohmic connections are made to the zones, that to the intermediate zone being termed the base and those to the outer zones being designated the emitter and collector respectively. The properties of such devices are discussed in an article by R. L. Wallace and W. J. Pietenpol in the Bell System Technical Journal, July 1951, page 530.

Of particular moment among the performance characteristics of junction transistors are the current multiplication factor, commonly designated alpha, and the operating frequency range, more particularly the frequency range over which at least a prescribed gain is realizable. Also of particular moment are the power capacity and operating stability.

One general object of this invention is to improve the performance characteristics of transistors.

More specifically, objects of this invention are to enhance the gain and operating frequency range of transistors, to increase the power capacity thereof, to improve the stability of such devices and to facilitate the construction of junction transistors.

In accordance with one feature of this invention, the semiconductive body of a transistor is constructed to optimize the base resistance and collector capacitance whereby, inter alia, substantial gain over a wide frequency range is attained. More specifically, in accordance with one feature of this invention, a region of the semiconductive body in a transistor, between the base and collector, is constructed to have a high resistivity, specifically substantially intrinsic conductivity, and the base layer or zone is constructed to have a very low resistivity. Consequently, both a low base resistance and a low collector capacitance are attained and this, it has been determined, leads to substantial enhancement of the performance characteristics of the device.

Particularly advantageously, the body is formed as a single crystal having therein a pair of contiguous zones, one of which is of the conductivity type desired for the base region and the other of which is of substantially intrinsic conductivity. The emitter and collector zones of a junction transistor are produced by introduction of an appropriate impurity into portions of the base and intrinsic zones thereby to create in these zones islands or layers of the conductivity type opposite that of the base zone.

In operation of the device, the emitter is biased in the forward direction and the collector in the reverse direction, both relative to the base. Because of the reverse bias on the collector, a space charge or barrier region obtains between the base and collector and this, by virtue of the presence of the substantially intrinsic region, can be made to extend from the collector to the base at a relatively low collector voltage. Further, barrier regions of substantial width, leading to low collector capacitances, are realizable.

Figure 2:
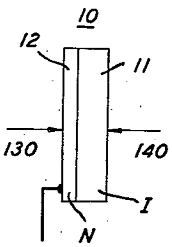

The invention and the above-noted and other features thereof will be understood more clearly and fully from the following detailed description with reference to the accompanying drawing in which:

Fig. 1 depicts diagrammatically a junction transistor illustrative of one embodiment of this invention;

Fig. 2 portrays another illustrative embodiment of this invention; and

Figure 3:
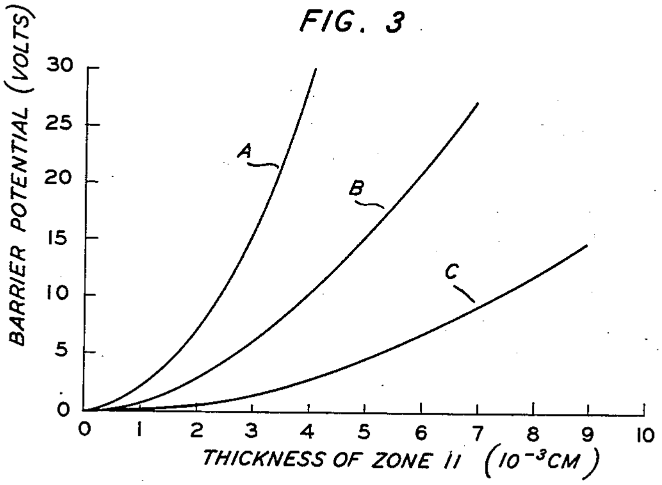
Figure 4:
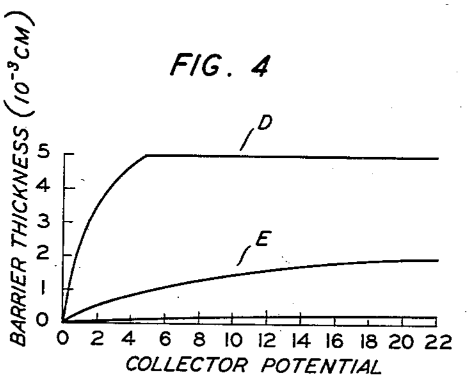
Figure 5:
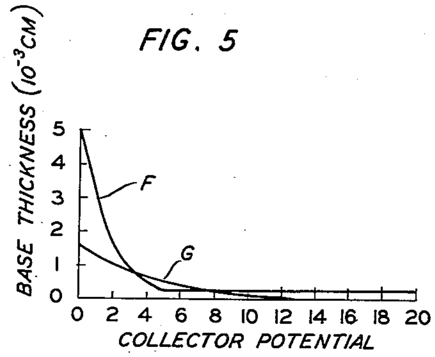

Figs. 3, 4 and 5 are graphs representing relations of certain parameters of particular moment in the operation of transistors constructed in accordance with this invention.

In the drawing, for the sake of clarity of illustration, the semiconductive body has been shown to a greatly enlarged scale. In typical devices, this body may be .001–.100 inch by .001–1.0 inch in cross section, the base zone may be of the order of $4\times10^{-5}$–$10^{-3}$ inch thick and the substantially intrinsic region may be of the order of $2.5\times10^{-4}$–$5\times10^{-3}$ inch thick. Also in the drawing, the conductivity type of each of the several zones is designated by the identifying letter, N, I or P.

Referring now to the drawing, the translating device portrayed in Fig. 1 comprises a disc or wafer 10 of semiconductive material, such as silicon or germanium, having therein a substantially intrinsic zone 11 and a zone 12 strongly of one conductivity type, for example N type as indicated. The disc or wafer 10 comprises also two zones 13 and 14 strongly of the conductivity type opposite that of the zone 12, for example P type as indicated. The zones 12, 13 and 14 constitute the base, emitter and collector regions respectively of the transistor and have ohmic connections thereto.

In operation of the device, the junction between the base and emitter regions 12 and 13 is biased in the forward direction as by a battery 17 and signals as from a source 18 are impressed between these two regions. The collector zone 14 is biased in the reverse direction with respect to the base as by battery 15 in series with a load represented generally by the resistor 16.

Advantageously the semiconductive disc or wafer is of single crystal construction fabricated for example in the manner disclosed in the application Serial No. 168,184, filed June 15, 1950, of G. K. Teal, now patent 2,727,840 issued December 20, 1955, the N zone 12 being produced by heavily doping a melt of substantially intrinsic material with a significant impurity such as antimony. The P regions 13 and 14 may be produced by alloying an acceptor impurity such as indium with the intrinsic and N type zones 11 and 12, respectively, as in the manner disclosed in the application Serial No. 270,370, filed February 7, 1952, of G. L. Pearson.

Advantageously, the zones 12, 13 and 14 are strongly extrinsic whereby, inter alia, a low base resistance is obtained, a copious supply of majority carriers is provided at the emitter zone 13 for injection into the base zone 12, and relatively high temperature insensitivity is realized at the collector. For example, in a typical device wherein the semiconductive material is germanium, the base zone 12 may have a resistivity of the order of .001–1.0 ohm centimeter and the emitter and collector zones 13 and 14 may have a resistivity of the order of or less than .001 ohm centimeter.

In the substantially intrinsic zone 11, however, the donors and acceptors are substantially in balance so that the excess carrier concentration is very small and the resistivity is high. Advantageously, the resistivity is greater than 30 ohm centimeter.

In operation of the device, advantageously the reverse bias upon the collector zone 14 is such that a space charge or barrier region extends through the intrinsic zone 11, that is bridges the space between the base and collector zones. As is now known, even for zero bias, an electrostatic potential obtains across each of the junctions between the intrinsic zone 11 and the base and collector zones 12 and 14. The sum of these and the collector bias requisite to extend the barrier region from base to collector is herein termed the barrier potential. The relation between the latter and thickness or width of the zone 11 is portrayed in Fig. 3 for several values of excess carrier concentration or resistivity for the zone 11 in germanium. Specifically, in this figure, curve A portrays the relation for a zone 11 having a resistivity of about 30 ohm centimeters corresponding to an excess carrier concentration of about $3\times10^{13}$/cc., curve B represents the case for a zone 11 of about 45 ohm centimeters resistivity, corresponding to an excess carrier concentration of about $10^{13}$/cc. and curve C shows the relation for a zone 11 wherein the excess carrier concentration is about $3\times10^{12}$. It will be noted from Fig. 3 that for a device wherein the zone 11 has the properties corresponding to curve C, a barrier potential of only about 5 volts is required when the zone 11 is about $5\times10^{-3}$ centimeters thick or wide.

The condition of a barrier region bridging the substantially intrinsic zone not only is obtainable at a relatively small collector bias, as pointed out hereinabove, but also obtains without substantial change with variations in the collector potential. Further, this is realized without deleterious diminution in the thickness of the base zone 12. As depicted by curve D in Fig. 4, in a device, such as represented in Fig. 1, wherein the semiconductive body is of PNIP configuration, the barrier width increases with collector potential up to a certain potential corresponding to the barrier potential, and then remains substantially constant. For a body of PNP configuration, however, as illustrated by curve E, the barrier width increases continuously with collector potential. Thus, devices constructed in accordance with this invention enable realization of high operating stability.

As portrayed by curve F in Fig. 5, in a PNIP transistor such as shown in Fig. 1, the effective width of the base decreases with collector potential until the barrier potential value is reached and thereafter remains substantially constant. For a PNP transistor, however, as indicated by curve G, the base width decreases with increasing collector potential until the width becomes zero, that is break through of the base zone occurs. Thus, as is evident, devices constructed in accordance with this invention enable operation at higher power levels than heretofore attainable without failure of the transistor.

Further, it has been found that in operation of transistors the gain at high frequencies is dependent upon the collector capacitance, the base resistance and the collector body resistance. Specifically, in order that gain may be maintained at high frequencies, it is advantageous that the product of the collector capacitance by the sum of the base resistance and the collector body resistance be small. In devices constructed in accordance with this invention, by virtue of the intrinsic region, a small collector capacitance is obtained. Also both the base resistance and collector body resistance may be made small readily. Thus, the product above noted is small and high gain over a wide frequency range is realized. Further, it will be appreciated that each of the three parameters involved is amenable to design control so that the relation thereof may be optimized to provide a prescribed operating characteristic, such, for example, as gain of at least a certain magnitude over a specified band of frequencies.

The invention may be embodied also in transistors including one or more point contacts. In one construction, illustrated in Fig. 2, the emitter is a point contact 130 bearing against the base zone 12 and the collector is a point contact bearing against the intrinsic region 11. Advantageously, the collector connection is formed electrically in ways now well known in the art. It will be understood also, of course, that the invention may be utilized in junction emitter-point collector and point emitter-junction collector transistors.

Ideally intrinsic semiconductive material, that is such wherein the donors and acceptors are exactly in balance, is not essential to the realization of the advantages of devices constructed in accordance with this invention. That is to say, the substantially intrinsic region I may be either slightly N or P type, say exhibiting an excess concentration of carriers of the order of $5\times10^{13}$ or having a resistivity of about 30 ohm centimeters or higher. Advantageously, the sign of the excess charge is such as to neutralize the space charge of the mobile carriers which carry the conduction current to the collector region. Thus, for a body of PNIP configuration such as illustrated in Fig. 1, the substantially intrinsic region may be slightly P type thereby to neutralize the space charge due to the holes injected into the base region or zone 12 from the emitter zone 13 and drawn toward the collector zone 14. The neutralization of space charge thus effected increases the current obtainable at a given voltage or conversely reduces the voltage requisite to obtain a prescribed current.

Although the invention has been described with particular reference to transistors including a semiconductive body of PNIP configuration, it may be utilized also in devices wherein this body is of NPIN configuration. Also, it will be understood that the embodiments of the invention shown and described are but illustrative and that various modifications may be made therein without departing from the scope and spirit of this invention.

What is claimed is:

1. A signal translating device comprising a body of semiconductive material having therein a first zone of substantially intrinsic conductivity and a second zone of extrinsic conductivity and of one conductivity type contiguous with said first zone, a substantially rectifying collector connection directly to said first zone, and a substantially nonrectifying base connection and one substantially rectifying emitter connection both directly to said second zone, whereby low collector to base capacity is achieved.

2. A signal translating device in accordance with claim 1 wherein said emitter connection comprises a zone in said body of a conductivity type opposite to that of said extrinsic zone and said collector connection comprises another zone of said opposite conductivity type in said body.

3. A signal translating device in accordance with claim 1 wherein each of said emitter and collector connections comprises a point contact.

4. A signal translating device in accordance with claim 1 wherein said emitter connection comprises a zone in said body of a conductivity type opposite to that of said extrinsic zone and said collector connection comprises a point contact.

5. A signal translating device in accordance with claim 1 wherein said emitter connection comprises a point contact and said collector connection comprises a zone in said body of a conductivity type opposite to that of said extrinsic zone.

References Cited in the file of this patent

UNITED STATES PATENTS

| | | |
|---|---|---|
| 2,569,347 | Shockley | Sept. 25, 1951 |
| 2,623,105 | Shockley et al. | Dec. 23, 1952 |